(12) United States Patent
Boone, Jr.

(10) Patent No.: US 9,613,647 B2
(45) Date of Patent: Apr. 4, 2017

(54) METHOD USING EPITAXIAL TRANSFER TO INTEGRATE HAMR PHOTONIC INTEGRATED CIRCUIT (PIC) INTO RECORDING HEAD WAFER

(71) Applicant: HGST Netherlands B.V., Amsterdam (NL)

(72) Inventor: Thomas Dudley Boone, Jr., San Jose, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/804,004

(22) Filed: Jul. 20, 2015

(65) Prior Publication Data

US 2015/0325264 A1    Nov. 12, 2015

Related U.S. Application Data (62) Division of application No. 13/954,620, filed on Jul. 30, 2013, now Pat. No. 9,105,286.

(51) Int. Cl.
| | |
|---|---|
| G11B 5/84 | (2006.01) |
| G11B 5/31 | (2006.01) |
| G11B 5/60 | (2006.01) |
| G11B 5/00 | (2006.01) |

(52) U.S. Cl.
CPC ............. *G11B 5/84* (2013.01); *G11B 5/314* (2013.01); *G11B 5/3163* (2013.01); *G11B 5/6088* (2013.01); *G11B 2005/0021* (2013.01)

(58) Field of Classification Search
CPC .......... G11B 5/84; G11B 5/314; G11B 5/3163
See application file for complete search history.

(56) References Cited

U.S. PATENT DOCUMENTS

| | | |
|---|---|---|
| 8,223,459 B2 | 7/2012 | Gage et al. |
| 8,670,295 B1 | 3/2014 | Hu et al. |
| 8,842,506 B1 | 9/2014 | Matsumoto et al. |
| 8,842,507 B1 | 9/2014 | Hirano et al. |
| 2009/0321881 A1 | 12/2009 | Archer et al. |
| 2009/0321885 A1 | 12/2009 | Archer et al. |
| 2009/0321886 A1 | 12/2009 | Gmitter et al. |
| 2009/0324379 A1 | 12/2009 | He et al. |
| 2009/0325367 A1 | 12/2009 | He et al. |
| 2010/0001316 A1 | 1/2010 | Gmitter et al. |
| 2010/0001374 A1 | 1/2010 | Gmitter et al. |
| 2010/0092668 A1 | 4/2010 | Hegedus |
| 2010/0116784 A1 | 5/2010 | Archer |
| 2010/0120233 A1 | 5/2010 | He |

(Continued)

*Primary Examiner* — Nadine Norton
*Assistant Examiner* — Mahmoud Dahimene
(74) *Attorney, Agent, or Firm* — Patterson & Sheridan, LLP (57) ABSTRACT

Embodiments of the present invention generally relate to a method for forming a HAMR device having a photonic integrated circuit that includes an optical detector, an optical emitter, and an optical element distinct from the optical detector and the optical emitter, where the elements of the photonic integrated circuit are aligned with a near field transducer. The method includes forming one or more layers on a substrate, bonding the layers to a partially fabricated recording head, removing the substrate using epitaxial lift-off, and forming the optical elements on the partially fabricated recording head.

18 Claims, 7 Drawing Sheets

(56) References Cited

U.S. PATENT DOCUMENTS

| | | |
|---|---|---|
| 2010/0147370 A1 | 6/2010 | He et al. |
| 2010/0151689 A1 | 6/2010 | Gmitter et al. |
| 2010/0206229 A1 | 8/2010 | He et al. |
| 2010/0206235 A1 | 8/2010 | He et al. |
| 2010/0209082 A1 | 8/2010 | He et al. |
| 2010/0209620 A1 | 8/2010 | He et al. |
| 2010/0209626 A1 | 8/2010 | He et al. |
| 2010/0212591 A1 | 8/2010 | He et al. |
| 2010/0219509 A1 | 9/2010 | He et al. |
| 2010/0229793 A1 | 9/2010 | He et al. |
| 2011/0214805 A1 | 9/2011 | Brown et al. |
| 2011/0243176 A1* | 10/2011 | Mooney ............... G11B 5/105 372/50.124 |
| 2011/0299080 A1 | 12/2011 | Peng |
| 2013/0082239 A1 | 4/2013 | Pan et al. |
| 2014/0307533 A1 | 10/2014 | Peng |

\* cited by examiner

Fig. 4G

METHOD USING EPITAXIAL TRANSFER TO INTEGRATE HAMR PHOTONIC INTEGRATED CIRCUIT (PIC) INTO RECORDING HEAD WAFER

CROSS-REFERENCE TO RELATED APPLICATIONS

This application is a divisional of co-pending U.S. patent application Ser. No. 13/954,620, filed Jul. 30, 2013, which patent application is herein incorporated by reference.

BACKGROUND

Field

Embodiments of the present invention generally relate to data storage systems, and more particularly, to thermally assisted recording devices.

Description of the Related Art

Higher storage bit densities in magnetic media used in disk drives have reduced the size (volume) of magnetic bits to the point where the magnetic bit dimensions are limited by the grain size of the magnetic material. Although grain size can be reduced further, the data stored within the magnetic bits may not be thermally stable. That is, random thermal fluctuations at ambient temperatures may be sufficient to erase data. This state is described as the superparamagnetic limit, which determines the maximum theoretical storage density for a given magnetic media. This limit may be raised by increasing the coercivity of the magnetic media or by lowering the temperature. Lowering the temperature may not always be practical when designing hard disk drives for commercial and consumer use. Raising the coercivity, on the other hand, requires write heads that incorporate higher magnetic moment materials, or techniques such as perpendicular recording (or both).

One additional solution has been proposed, which uses heat to lower the effective coercivity of a localized region on the magnetic media surface and writes data within this heated region. The data state becomes "fixed" once the media cools to ambient temperatures. This technique is broadly referred to as "thermally assisted (magnetic) recording" (TAR or TAMR), "energy assisted magnetic recording" (EAMR), or "heat-assisted magnetic recording" (HAMR) which are used interchangeably herein. It can be applied to longitudinal and perpendicular recording systems as well as "bit patterned media". Heating of the media surface has been accomplished by a number of techniques such as focused laser beams or near-field optical sources.

Typically, external optoelectronic devices such as lasers or photodiodes are integrated into a finished slider through optical coupling to various waveguides that then guide and focus the light onto a plasmonic near field transducer used to generate the heat spot. This approach requires challenging mechanical alignment operations in order to achieve the necessary efficient coupling to the waveguide.

Therefore, an improved method for forming a HAMR device is needed.

SUMMARY OF THE INVENTION

Embodiments of the present invention generally relate to a method for forming a HAMR device having a photonic integrated circuit that includes an optical detector, an optical emitter, and an optical element distinct from the optical detector and the optical emitter, where the elements of the photonic integrated circuit are aligned with a near field transducer. The method includes forming one or more layers on a substrate, bonding the layers to a partially fabricated recording head, removing the substrate using epitaxial lift-off, and forming the optical elements on the partially fabricated recording head.

In one embodiment, a method for forming a heat assisted magnetic recording device is disclosed. The method includes forming a partially fabricated recording head on a first substrate, forming a sacrificial layer on a second substrate, forming one or more additional layers on the sacrificial layer, bonding the one or more additional layers to the partially fabricated recording head opposite the first substrate, performing epitaxial lift-off to remove the sacrificial layer and the second substrate, and patterning the one or more additional layers to form a plurality of optical elements.

In another embodiment, a method for forming a heat assisted magnetic recording device is disclosed. The method includes forming a partially fabricated recording head on a first substrate, forming a sacrificial layer on a second substrate, forming one or more additional layers on the sacrificial layer, forming a third substrate over the one or more additional layers, performing epitaxial lift-off to remove the sacrificial layer and the second substrate, bonding the one or more additional layers to the partially fabricated recording head opposite the first substrate, removing the third substrate, and patterning the one or more additional layers to form a plurality of optical elements.

In another embodiment, a heat assisted magnetic recording device is disclosed. The heat assisted magnetic recording device includes an optical detector, an optical emitter, an optical element distinct from the optical detector and the optical emitter, and a near field transducer, wherein the optical detector, the optical emitter, and the optical element are aligned with the near field transducer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Embodiments of the present invention generally relate to a method for forming a HAMR device having a photonic integrated circuit that includes an optical detector, an optical emitter, and an optical element distinct from the optical detector and the optical emitter, where the elements of the photonic integrated circuit are aligned with a near field transducer. The method includes forming one or more layers on a substrate, bonding the layers to a partially fabricated recording head, removing the substrate using epitaxial lift-off, and forming the optical elements on the partially fabricated recording head.

Figure 1A:
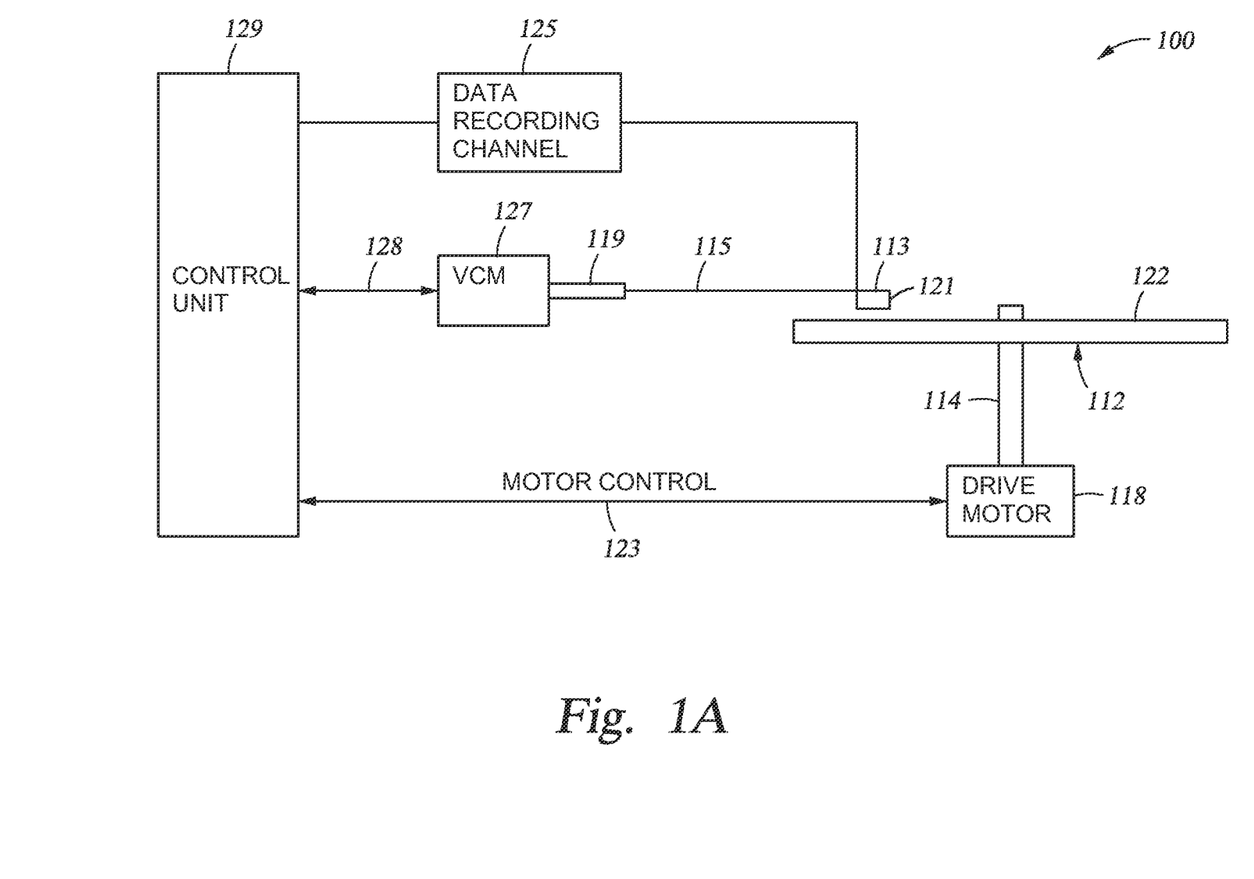
FIGS. 1A-1B illustrate a disk drive system, according to embodiments of the invention.

FIG. 1A illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 121 that may include a radiation source (e.g., a laser or electrically resistive heater) for heating the disk surface 122. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases slider 113 towards the disk surface 122. Each actuator arm 119 is attached to an actuator means 127. The actuator means 127 as shown in FIG. 1A may be a voice coil motor (VCM). The VCM includes a coil movable within a fixed magnetic field, the direction and speed of the coil movements being controlled by the motor current signals supplied by control unit 129.

During operation of a HAMR enabled disk drive 100, the rotation of the magnetic disk 112 generates an air bearing between the slider 113 and the disk surface 122 which exerts an upward force or lift on the slider 113. The air bearing thus counter-balances the slight spring force of suspension 115 and supports slider 113 slightly above the disk 112 surface by a small, substantially constant spacing during normal operation. The radiation source heats up the high-coercivity data bits so that the write elements of the magnetic head assemblies 121 may correctly magnetize the data bits.

The various components of the disk storage system are controlled in operation by control signals generated by control unit 129, such as access control signals and internal clock signals. Typically, the control unit 129 includes logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic disk storage system and the accompanying illustration of FIG. 1A are for representation purposes only. It should be apparent that disk storage systems may contain a large number of disks and actuators, and each actuator may support a number of sliders.

Figure 1B:
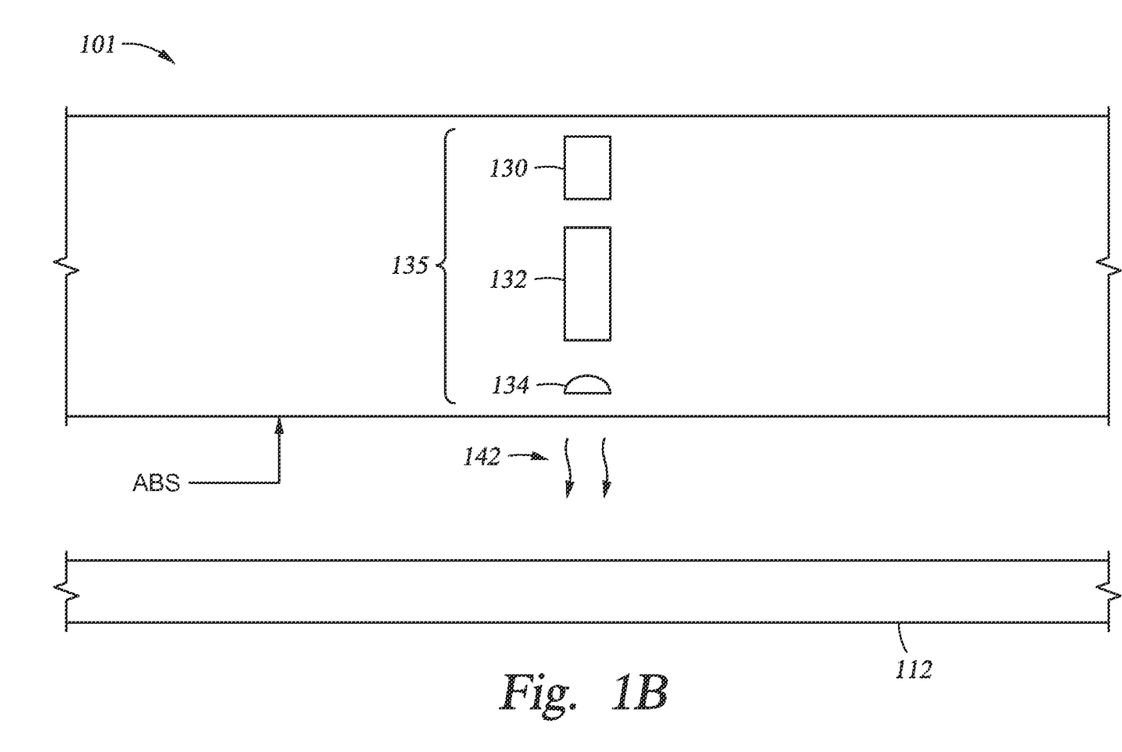

FIG. 1B is a cross sectional schematic of a HAMR enabled write head 101, according to one embodiment of the invention. The head 101 includes a photonic integrated circuit 135. The photonic integrated circuit 135 includes a plurality of optical elements such as an optical detector 130, an optical emitter 132 and an optical element 134 that is distinct from the optical detector 130 and the optical emitter 132. The optical detector 130 may be a photodiode for optical power monitoring, such as a PN photodiode, a PIN photodiode, an avalanche photodiode, a phototransistor, a metal-semiconductor-metal photodiode, or a photoresistor. The optical emitter 132 may be any suitable optical emitter such as a light-emitting diode (LED), a superluminescent LED, a Fabry Perot laser diode, a distributed Bragg reflector laser diode, a distributed feedback laser diode, a resonant cavity LED, a microdisk laser, a quantum cascade laser or a vertical-cavity surface-emitting laser. The optical element 134 may be a solid immersion lens, a solid immersion mirror, an optical modulator, a distributed Bragg reflector, a microdisk resonator, a feedback waveguide coupler, an optical filter, a spot size convertor or a diffraction grating.

The optical emitter 132, such as a laser, delivers radiation to a near field transducer (NFT) 140—e.g., a plasmonic device or an optical transducer—which is located at or near the air-bearing surface (ABS). The optical element 134, such as a solid immersion lens, enables more light to be focused on the NFT 140. The utilization of the solid immersion lens also provides a wider optical emitter 132, which will enable more power to be delivered at a lower current density. The optical detector 130 enables the laser power to be monitored directly during magnetic recording. The NFT 140 further focuses the beamspot to avoid heating neighboring tracks of data on the disk 112—i.e., creates a beamspot much smaller than the diffraction limit. As shown by arrows 142, this optical energy emits from the NFT 140 to the surface of the disk 112 below the ABS of the head 101. The embodiments herein are not limited to any particular type of NFT and may operate with, for example, either a c-aperature, e-antenna plasmonic near-field source, or any other shaped transducer known in the art.

Figure 2:
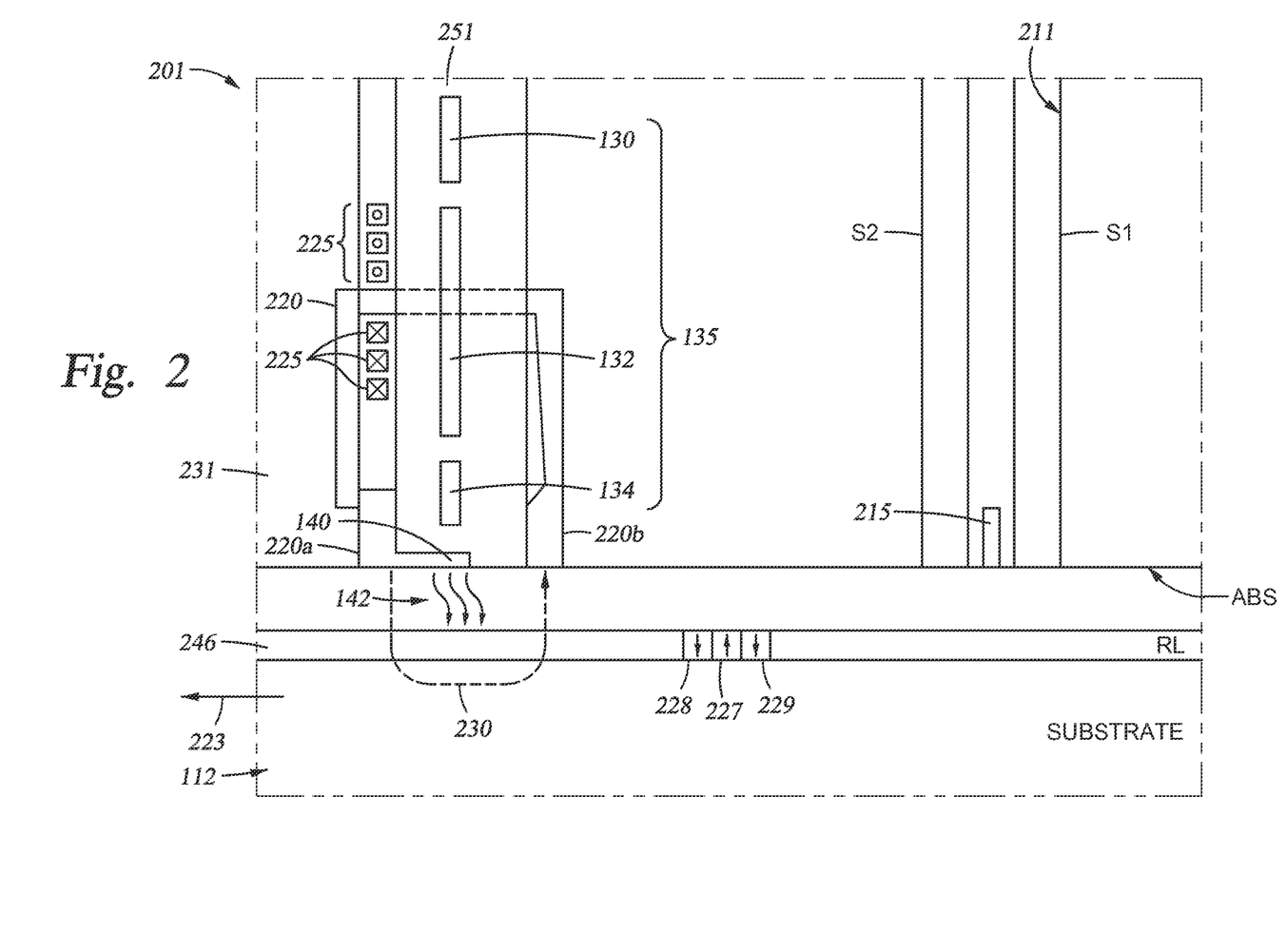
FIG. 2 illustrates a cross-sectional schematic diagram of a HAMR enabled head of a disk drive, according to one embodiment of the invention.

FIG. 2 illustrates a cross-sectional schematic diagram of a HAMR enabled disk drive, according to one embodiment of the invention. Specifically, FIG. 2 illustrates a portion of a head 201 and associated perpendicular magnetic recording disk 112 for a HAMR disk drive which uses the photonic integrated circuit 135 for generating and directing heat to the disk 112. The disk 112 includes a substrate and a perpendicular magnetic recording layer (RL) 246. In one embodiment, the disk 112 may include an optional "soft" or relatively low-coercivity magnetically permeable underlayer (SUL). However, the SUL is not required for a HAMR disk drive 100.

The RL 246 may be any media with perpendicular magnetic anisotropy, such as a cobalt-chromium (CoCr) alloy granular layer grown on a special growth-enhancing sublayer, or a multilayer of alternating films of Co with films of platinum (Pt) or palladium (Pd). The RL 246 may also be an $L1_0$ ordered alloy such as FePt or FeNiPt. The disk 112 may also include a protective overcoat (not shown) over the RL 246.

The head 201 has a substrate trailing surface 211 and an ABS surface oriented generally perpendicular to trailing surface 211. The trailing surface 211 is typically formed of a composite material, such as a composite of alumina/titanium-carbide ($Al_2O_3$/TiC), and supports the read and write elements which are typically formed as a series of thin films and structures on the trailing surface 211. The disk 112 may spin in a direction 223 away from the trailing surface 211 and towards the other layers of the head 201. The ABS is the recording-layer-facing surface of the slider that faces the disk 112. Note that FIG. 2 is not drawn to scale because of the difficulty in showing the very small features and, for the sake of clarity, omits structures from the head such as spacing and insulating layers.

The head 201 includes a magnetoresistive read pole 215 located between shields S1 and S2, and a perpendicular write head that includes a magnetic yoke 220 with a write pole 220a, a return pole 220b, and an electrically conductive coil 225. The write pole 220a is formed of a high-moment material, such as a NiFe or FeCoNi alloy. The write coil 225 is wrapped around the yoke 220 with the electrical current directions being shown as into the paper by the coil cross-sections marked with an "X" and out of the paper by the coil cross-sections marked with a solid circle. When write-current pulses are directed through the coil 225, the write pole 220a directs magnetic flux, represented by arrow 230, to the RL 246. Further, the magnetic flux 230 continues through the substrate or a SUL layer before arriving at the return pole 220b. However, the invention is not limited to the structure and material discussed above. For example, the coil 225 may be a helical coil or the write pole 220a may include a wrap-around shield. Further, the present invention may operate with any recording head that can perform the functions discussed herein.

The head 201 may also include a non-magnetic material 251 between the return pole 220b and the write pole 220a. The non-magnetic material 251 may include $SiO_2$ and $Al_2O_3$. The photonic integrated circuit 135 having an optical detector 130, an optical emitter 132, and an optical element 134 distinct from the optical detector 130 and the optical emitter 132, as well as the NFT 140 are embedded in the non-magnetic material 251. The photonic integrated circuit 135 may extend through the yoke 220 and is located between the write pole 220a and the return pole 220b. As noted by the ghosted lines, the yoke 220 may continuously connect the write pole 220a to the return pole 220b. The photonic integrated circuit 135 and the NFT 140 may be fabricated at any location such that the NFT 140 passes over a portion of the spinning magnetic disk 112 prior to that portion passing below the write pole 220a. Specifically, the photonic integrated circuit 135 may be located between shield S2 and return pole 220b, or between the write pole 220a and the outer face 231 of the head 201 (if the disk 112 rotates opposite of the direction 223 shown).

While writing to the disk 112, the RL 246 moves relative to the head 201 in the direction shown by arrow 223. In HAMR, the optical energy 142 emitted from the NFT 140 temporarily lowers the coercivity ($H_c$) of the RL 246 so that the magnetic recording regions 227, 228, 229 may be oriented by the write field from write pole 220a. The magnetic recording regions 227, 228, 229 become oriented by the write field if the write field ($H_w$) is greater than $H_c$. After a region of the RL 246 in the data track has been exposed to $H_w$, from the write pole 220a and the resulting heat from the optical energy 142 from the NFT 140, the region's temperature falls below the Curie temperature and the data associated with the magnetic orientations is recorded. Specifically, the transitions between recorded regions (such as previously recorded regions 227, 228, and 229) represent written data "bits" that can be read by the read pole 215. In this manner, the NFT 140 uses the optical energy 142 to heat the RL layer 246 and lower its magnetic coercivity.

The photonic integrated circuit 135 is formed during the processing of the head 201, which eliminates the need for optical coupling the optoelectronic elements to various waveguides that then guide the light onto the NFT 140 to generate the heat spot. The elements of the photonic integrated circuit 135 may be all fabricated from the same semiconductor thin films that are transferred to the head 201. Thus, the challenging mechanical alignment operations to achieve the efficient coupling to the waveguide are avoided. FIGS. 3A-3F describe a process of forming the photonic integrated circuit 135 in the head 201 according to one embodiment of the invention.

Figure 3A:
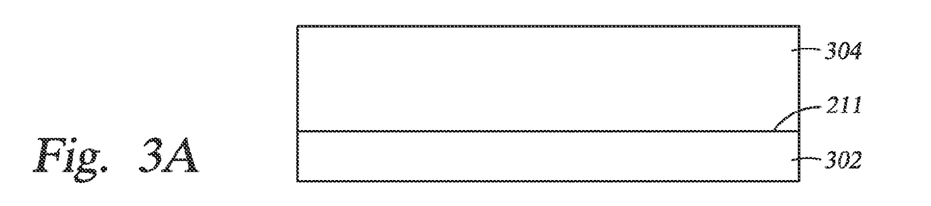
FIGS. 3A-3F illustrates a process of making a HAMR enabled head, according to one embodiment of the invention.

FIG. 3A is a cross-sectional view of a substrate 302 and a partially fabricated recording head 304. The substrate 302 may be a composite material, such as a composite of alumina/titanium-carbide (AlTiC), and may have the trailing surface 211 on which the read and write elements are formed by a series of deposition processes of thin films and structures. The partially fabricated recording head 304 may include parts of the head 201, such as the shields S1 and S2, the read pole 215, and the return pole 220b, that are trailing to the photonic integrated circuit 135 as shown in FIG. 2. Alternatively, the partially fabricated recording head 304 may include parts that are leading to the photonic integrated circuit 135, such as the coils 225 and the write pole 220a, as shown in FIG. 2.

Figure 3B:
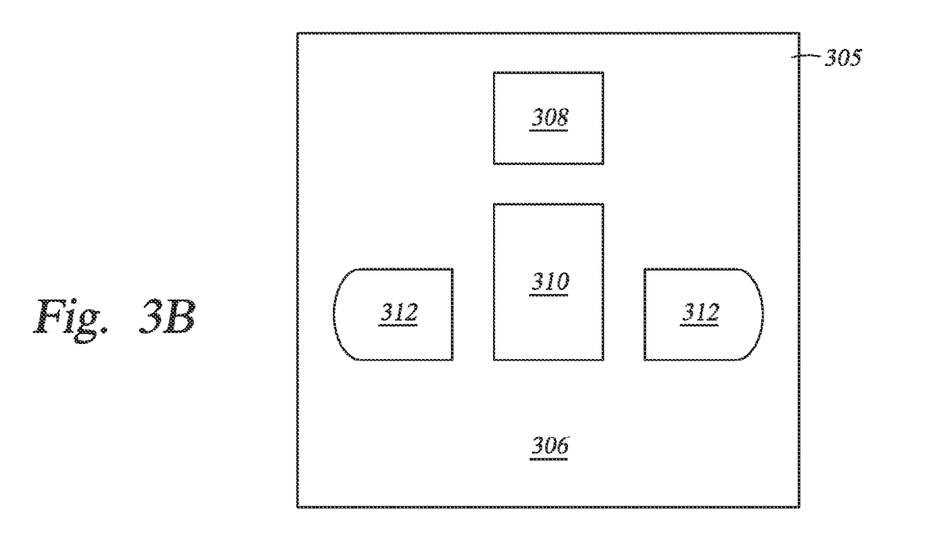
Figure 3C:
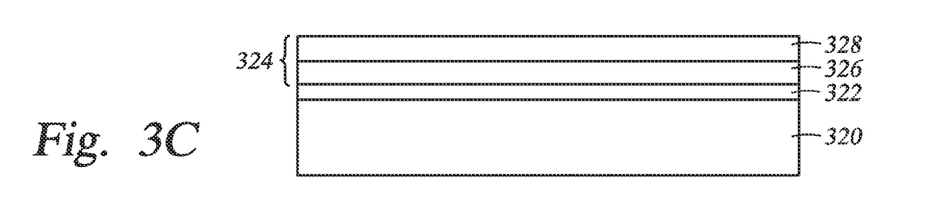

FIG. 3B is a top view of the partially fabricated recording head 304. The surface 305 may have been planarized by one or more chemical mechanical polishing (CMP) processes and may include a non-magnetic material 306, a first metal contact 308 for the optical detector 130, a second metal contact 310 for the optical emitter 132, and magnetic back gaps 312. FIG. 3C is a cross-sectional view of a second substrate 320, a sacrificial layer 322, and one or more additional layers 324. The second substrate 320 may comprise gallium arsenide (GaAS), the sacrificial layer 322 may comprise an aluminum arsenide (AlAs) layer, a strain induced fracture layer, or a germanium (Ge) layer, and the one or more additional layers 324 may comprise of one or more III-V semiconductor materials. An example of a strain induced fracture layer that is used for the sacrificial layer 322 is a pseudomorphically grown III-V lattice mismatched layer such as indium gallium arsenide (InGaAs). Another example of a strain induced fracture layer is a damaged layer created by proton bombardment.

In one embodiment, as shown in FIG. 3C, the one or more additional layers 324 include a first layer 326 disposed on the sacrificial layer 322 and a second layer 328 disposed on the first layer 326. The first layer 326 may be an n-type III-V semiconductor layer, such as n-type aluminum gallium arsenide (AlGaAs), or a p-type III-V semiconductor layer, such as p-type AlGaAs. The second layer 328 may be a p-type III-V semiconductor layer, such as p-type AlGaAs, or an n-type III-V semiconductor layer, such as n-type AlGaAs. The layers 326, 328 may be formed epitaxially. The one or more additional layers 324 are not limited to the first and second layers 326, 328. From the one or more additional layers 324, the photonic integrated circuit 135 may be formed using various photolithographic processes. Any layer structure suitable for forming the photonic integrated circuit 135 may be utilized as the one or more additional layers 324. In one embodiment, the one or more additional layers 324 may include structures such as a heterojunction, a quantum well, and/or metallic ohmic contacts. The quantum well may comprise a GaAs layer sandwiched between two AlGaAs layers.

Figure 3D:
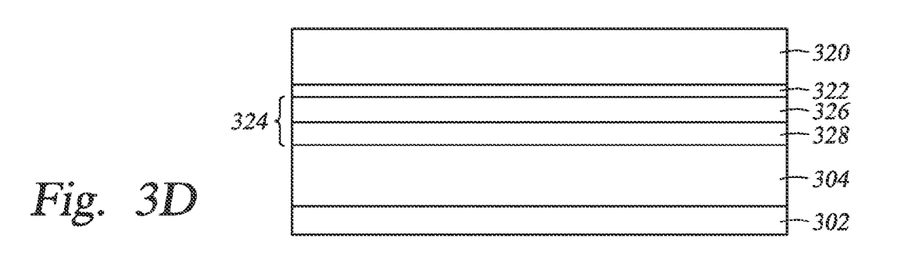

As shown in FIG. 3D, the substrate 320 with the layers 324 and 322 disposed thereon is bonded with the substrate 302 having the partially fabricated recording head 304 disposed thereon. Particularly, the second layer 328, such as a p-type AlGaAs layer, is bonded to the surface 305 of the partially fabricated recording head 304. The bonding may be achieved by any suitable bonding method. In one embodiment, the bonding is achieved by the second layer 328 forming Van der Waals bond to the surface 305. In another embodiment, an epoxy layer is used to bond the second layer 328 to the surface 305.

Figure 3E:
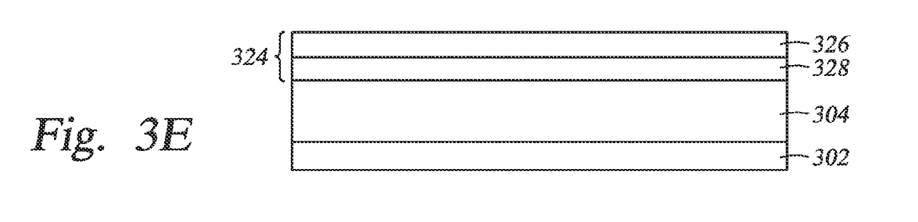

Next, the sacrificial layer 322 and the second substrate 320 are removed from the structure, as shown in FIG. 3E. In one embodiment, the removal is achieved by an epitaxial lift-off. The epitaxial lift-off may be performed by etching away the sacrificial layer 322 with a highly selective etch process. For an AlAs sacrificial layer 322, aqueous hydrofluoric acid (HF) is used to etch the AlAs sacrificial layer 322. As the AlAs sacrificial layer 322 is etched away, the second substrate 320 is removed from the stack. For a Ge sacrificial layer 322, xenon difluoride ($XeF_2$) dry etch is used. The epitaxial lift-off may be also performed by removing the sacrificial layer 322 through various thermal and mechanical treatments, such as rapid temperature quench or mechanical force, when the sacrificial layer 322 is a strain induced fracture layer.

Figure 3F:
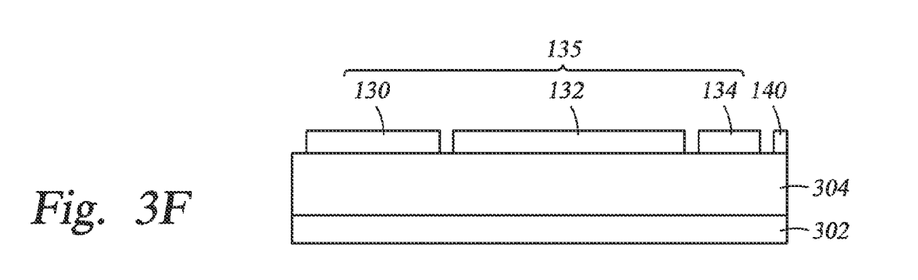

As shown in FIG. 3F, one or more photolithographic processes are performed on the one or more additional layers 324 to form the photonic integrated circuit 135. The photonic integrated circuit 135 includes the optical detector 130, the optical emitter 132, and the optical element 134 from the one or more additional layers 324. The optical detector 130 may be formed on the first metal contact 308 and the optical emitter may be formed on the second metal contact 310. In addition, the NFT 140 may be formed on the partially fabricated recording head 304. By incorporating the photonic integrated circuit 135 directly into the substrate process, the NFT 140 is self aligned with the elements of the photonic integrated circuit 135. In one embodiment, the NFT 140 is formed on the partially fabricated recording head 304 before the transferring of the one or more additional layers 324 to the partially fabricated recording head 304. After the formation of the photonic integrated circuit 135 and the NFT 140, subsequent processing is performed to build the remainder of the electrical and magnetic elements necessary to complete the recording head.

The process illustrated in FIGS. 3A-3F shows transferring of full layers 324 from the second substrate 320 to the partially fabricated recording head 304. In other embodiments, the layers 324 are first processed using microfabrication to isolate semiconductor mesas before transferring to the partially fabricated recording head 304. Before the transferring of the semiconductor mesas to the partially fabricated recording head 304, metal contacts may be formed on the semiconductor mesas. After the transferring to the partially fabricated recording head 304, the semiconductor mesas are processed to form the photonic integrated circuit 135 by one or more photolithographic processes.

As illustrated in FIGS. 3A-3F, the one or more additional layers 324 are transferred from the second substrate 320 directly to the partially fabricated recording head 304. In one embodiment, the one or more additional layers 324 are first transferred to a carrier substrate and then transferred to the partially fabricated recording head 304 from the carrier substrate. FIGS. 4A-4G illustrate such process.

Figure 4A:
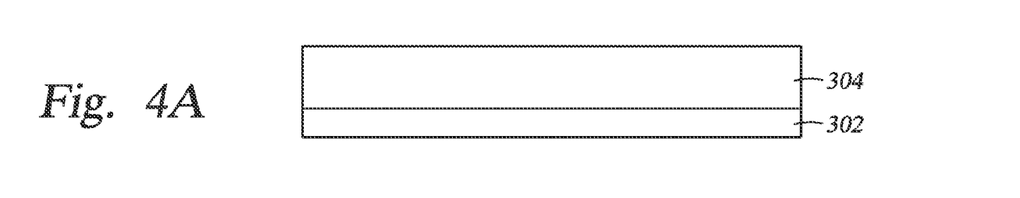
FIGS. 4A-4G illustrates a process of making a HAMR enabled head, according to one embodiment of the invention.
Figure 4B:
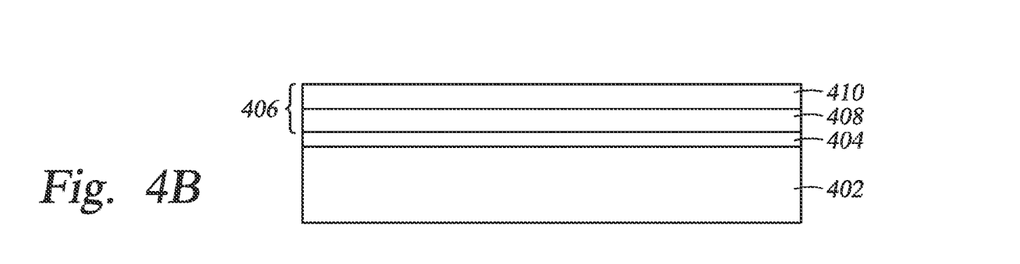

The process starts with the first substrate 302 and the partially fabricated recording head 304 disposed on the first substrate 302, as shown in FIG. 4A. FIG. 4B is a cross-sectional view of a second substrate 402, a sacrificial layer 404, and one or more additional layers 406. The second substrate 402 may comprise GaAS, the sacrificial layer 404 may comprise an AlAs layer, a strain induced fracture layer, or a Ge layer, and the one or more additional layers 406 may comprise of one or more III-V semiconductor materials. An example of a strain induced fracture layer that is used for the sacrificial layer 404 is a pseudomorphically grown III-V lattice mismatched layer such as InGaAs. Another example of a strain induced fracture layer is a damaged layer created by proton bombardment.

In one embodiment, as shown in FIG. 4B, the one or more additional layers 406 include a first layer 408 disposed on the sacrificial layer 404 and a second layer 410 disposed on the first layer 408. The first layer 408 may be a p-type III-V semiconductor layer, such as p-type AlGaAs, or a n-type III-V semiconductor layer, such as n-type AlGaAs. The second layer 410 may be an n-type III-V semiconductor layer, such as n-type AlGaAs, or a p-type III-V semiconductor layer, such as p-type AlGaAs. The layers 408, 410 may be formed epitaxially. The one or more additional layers 406 are not limited to the first and second layers 408, 410. From the one or more additional layers 406, the photonic integrated circuit 135 may be formed using various photolithographic processes. Any layer structure suitable for forming the photonic integrated circuit 135 may be utilized as the one or more additional layers 406. In one embodiment, the one or more additional layers 406 may include structures such as a heterojunction, a quantum well, and/or metallic ohmic contacts. The quantum well may comprise a GaAs layer sandwiched between two AlGaAs layers.

Figure 4C:
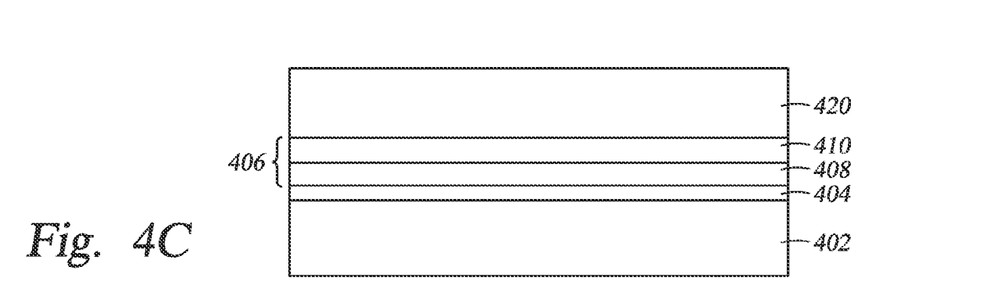
Figure 4D:
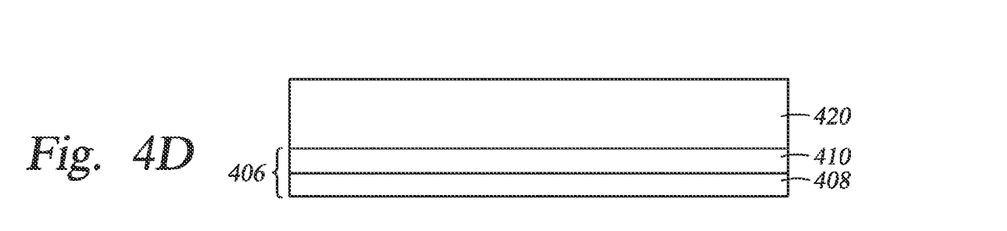

Next, a third substrate 420 is formed over the one or more additional layers 406, as shown in FIG. 4C. The third substrate 420 may be a carrier substrate that is made of a rigid material such as metal, glass, or silicon. Alternatively, the carrier substrate may be made of a flexible material such as flexible metal or polymer such as polyamide. An epitaxial lift-off may be performed to remove the sacrificial layer 404 and the second substrate 402, as shown in FIG. 4D. Again the epitaxial lift-off may be performed by etching away the sacrificial layer 404 with a highly selective etch process. For an AlAs sacrificial layer 404, aqueous HF is used to etch the AlAs sacrificial layer 404. As the AlAs sacrificial layer 404 is etched away, the second substrate 402 is removed from the stack. For a Ge sacrificial layer 404, $XeF_2$ dry etch is used. The epitaxial lift-off may be also performed by removing the sacrificial layer 404 through various thermal and mechanical treatments, such as rapid temperature quench or mechanical force, when the sacrificial layer 404 is a strain induced fracture layer. At the end of the epitaxial lift-off, the first layer 408 is exposed.

Figure 4E:
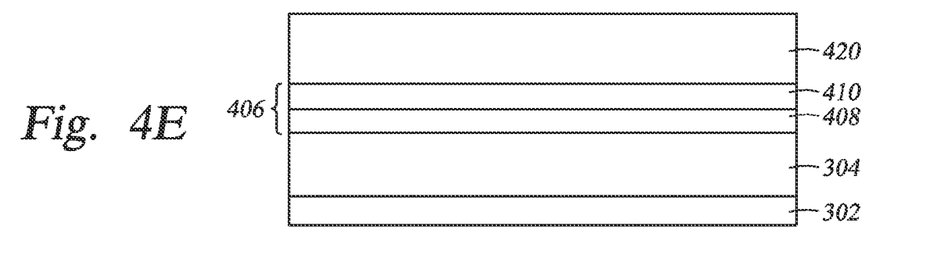

Next, the first layer 408 is bonded to the partially fabricated recording head 304, as shown in FIG. 4E. The bonding may be achieved by any suitable bonding method. In one embodiment, the bonding is achieved by the first layer 408 forming Van der Waals bond to the partially fabricated recording head 304. In another embodiment, an epoxy layer is used to bond the first layer 408 to partially fabricated recording head 304.

Figure 4F:
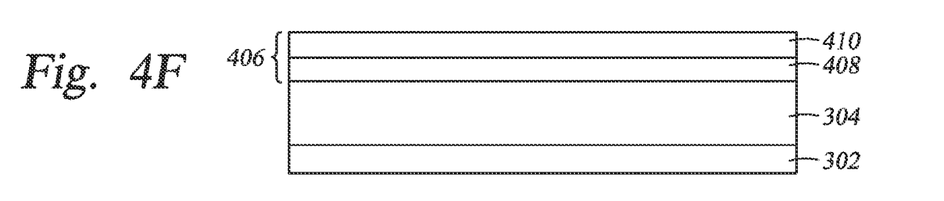
Figure 4G:
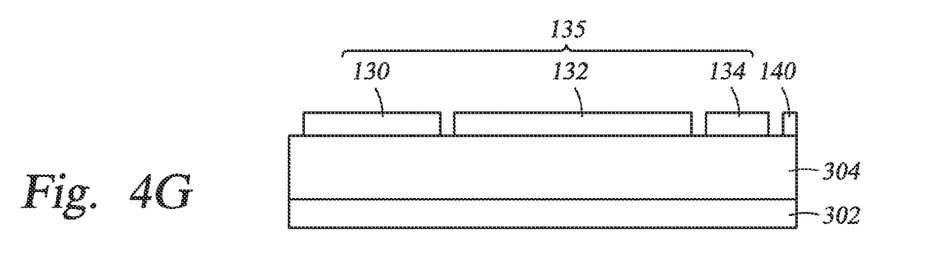

The third substrate 420 is then removed using any suitable removal method, such as etching or CMP, leaving the one or more additional layers 406 exposed as shown in FIG. 4F. Next, one or more photolithographic processes are performed to form the photonic integrated circuit 135 from the one or more additional layers 406. The photonic integrated circuit 135 includes the optical detector 130, the optical emitter 132, and the optical element 134 from the one or more additional layers 406. In addition, the NFT 140 may be formed on the partially fabricated recording head 304. By incorporating the photonic integrated circuit 135 directly into the substrate process, the NFT 140 is self aligned with the elements of the photonic integrated circuit 135. In one embodiment, the NFT 140 is formed on the partially fabricated recording head 304 before the transferring of the one or more additional layers 406 to the partially fabricated recording head 304. After the formation of the photonic integrated circuit 135 and the NFT 140, subsequent processing is performed to build the remainder of the electrical and magnetic elements necessary to complete the recording head.

The process illustrated in FIGS. 4A-4G shows transferring of full layers 406 from the second substrate 402 to the partially fabricated recording head 304. In other embodiments, the layers 406 are processed using micro-fabrication to isolate semiconductor mesas before transferring to the partially fabricated recording head 304. Before the transferring of the semiconductor mesas to the partially fabricated recording head 304, metal contacts such as metallic ohmic contacts may be formed on the semiconductor mesas. After the transferring to the partially fabricated recording head 304, the semiconductor mesas are processed to form the photonic integrated circuit 135 by one or more photolithographic processes.

In summary, a method for forming a HAMR device is disclosed. One or more layers are formed on a substrate and subsequently transferred to a partially fabricated recording head. The one or more layers may be processed to form semiconductor mesas before the transfer. After transferring the one or more layers or the semiconductor mesas to the partially fabricated recording head, one or more photolithographic processes are performed on the one or more layers or the semiconductor mesas to form a photonic integrated circuit having an optical detector, an optical emitter and an optical element distinct from the optical detector and the optical emitter. An NFT may be formed on the partially fabricated recording head before or after the transferring of the one or more layers or the semiconductor mesas. By incorporating the photonic integrated circuit 135 directly into the substrate process, the NFT 140 is self aligned with the elements of the photonic integrated circuit 135.

While the foregoing is directed to embodiments of the present invention, other and further embodiments of the invention may be devised without departing from the basic scope thereof, and the scope thereof is determined by the claims that follow.

What is claimed is:

1. A method for forming a heat assisted magnetic recording device, sequentially comprising:
    forming a partially fabricated recording head on a first substrate;
    forming a sacrificial layer on a second substrate;
    forming one or more additional layers on the sacrificial layer;
    bonding the one or more additional layers to the partially fabricated recording head opposite the first substrate;
    performing epitaxial lift-off to remove the sacrificial layer and the second substrate; and
    patterning the one or more additional layers to form a plurality of optical elements.

2. The method of claim 1, wherein the first substrate comprises AlTiC.

3. The method of claim 2, wherein the second substrate comprises GaAs.

4. The method of claim 3, wherein the sacrificial layer comprises AlAs, and the epitaxial lift-off comprises removing the sacrificial layer using aqueous HF etch.

5. The method of claim 3, wherein the epitaxial lift-off comprises removing the sacrificial layer using rapid temperature quench or mechanical force.

6. The method of claim 3, wherein the sacrificial layer comprises Ge, and the epitaxial lift-off comprises removing the sacrificial layer using $XeF_2$ dry etch.

7. The method of claim 4, wherein the one or more additional layers comprise one or more III-V semiconductor materials.

8. The method of claim 7, wherein the one or more additional layers include at least one of: a heterojunction, a quantum well and metallic ohmic contacts.

9. The method of claim 1, wherein the plurality of optical elements comprises an optical detector, an optical emitter, and an optical element distinct from the optical detector and the optical emitter.

10. The method of claim 1, further comprising forming a near field transducer after the bonding of the one or more additional layers to the partially fabricated recording head.

11. A method for forming a heat assisted magnetic recording device, sequentially comprising:
    forming a partially fabricated recording head on a first substrate;
    forming a sacrificial layer on a second substrate;
    forming one or more additional layers on the sacrificial layer;
    forming a third substrate over the one or more additional layers;
    performing epitaxial lift-off to remove the sacrificial layer and the second substrate and to expose the one or more additional layers;
    bonding the one or more additional layers to the partially fabricated recording head opposite the first substrate;
    removing the third substrate; and
    patterning the one or more additional layers to form a plurality of optical elements.

12. The method of claim 11, wherein the first substrate comprises AlTiC.

13. The method of claim 12, wherein the second substrate comprises GaAs.

14. The method of claim 13, wherein the sacrificial layer comprises AlAs, and the epitaxial lift-off comprises removing the sacrificial layer using aqueous HF etch.

15. The method of claim 14, wherein the one or more additional layers comprise one or more III-V semiconductor materials.

16. The method of claim 15, wherein the one or more additional layers include at least one of: a heterojunction, a quantum well and metallic ohmic contacts.

17. The method of claim 11, further comprising forming a near field transducer after the bonding of the one or more additional layers to the partially fabricated recording head.

18. The method of claim 11, wherein the third substrate comprises a material selected from the group consisting of metal, glass, silicon, and polyamide.

* * * * *